United States Patent [19]

Wolber

[11] 4,211,119
[45] Jul. 8, 1980

[54] SELF-STANDARDIZING PRESSURE SENSOR FOR USE IN AN ELECTRONIC FUEL CONTROL SYSTEM

[75] Inventor: William G. Wolber, Southfield, Mich.

[73] Assignee: The Bendix Corporation, Southfield, Mich.

[21] Appl. No.: 948,076

[22] Filed: Oct. 2, 1978

[51] Int. Cl.² .................................................. G01L 7/08
[52] U.S. Cl. ....................................... 73/721; 73/4 V; 123/445 GS
[58] Field of Search ..................... 73/119 A, 4 R, 4 V, 73/714, 717, 718, 719, 720, 721, 722, 756, 119 A, 717; 123/32 EA

[56] References Cited

U.S. PATENT DOCUMENTS

| | | | |
|---|---|---|---|
| 2,515,259 | 7/1950 | O'Brien et al. | 335/253 |
| 3,541,849 | 11/1970 | Corbett | 73/141 |
| 3,583,374 | 6/1971 | Scholl et al. | 123/32 E |
| 3,651,791 | 3/1972 | Kobayashi | 123/32 EA |
| 3,730,146 | 5/1973 | Moulds et al. | 123/32 EA |
| 3,891,870 | 6/1975 | Corbett | 310/8.7 |
| 3,894,435 | 7/1975 | Shimada et al. | 73/393 |
| 3,942,364 | 3/1976 | Bunker | 73/115 |
| 4,015,571 | 4/1977 | Stumpp | 123/139 AW |
| 4,067,241 | 1/1978 | Corbett | 73/717 |

Primary Examiner—Jerry W. Myracle
Attorney, Agent, or Firm—Gaylord P. Haas, Jr.; Russel C. Wells

[57] ABSTRACT

A self-standardizing pressure sensor (60) for use with an electronic fuel control system of an internal combustion engine. The sensor (60) includes a body (100) having first and second external ports (120, 122) for sensing manifold absolute pressure (MAP) and ambient atmospheric pressure (AAP), respectively. An internal valve (110) within the body (100) is biased to normally register with the MAP port (120), but is actuatable to register with the AAP port (122). The valve (110) includes an internal passage (126) which communicates whichever of the ports (120, 122) is selected to an internal pressure chamber. One wall of the chamber is defined by a flexural diaphragm (144). Flexing of the diaphragm is transmitted to an electromechanical transducer (172) which produces an output signal representative of the pressure in the internal chamber. A normal force bias (146) is applied to the diaphragm (144), but is temporarily removed by actuation of the internal valve (110) to effectively unload the diaphragm (144) to permit standardization of the sensor (60).

17 Claims, 5 Drawing Figures

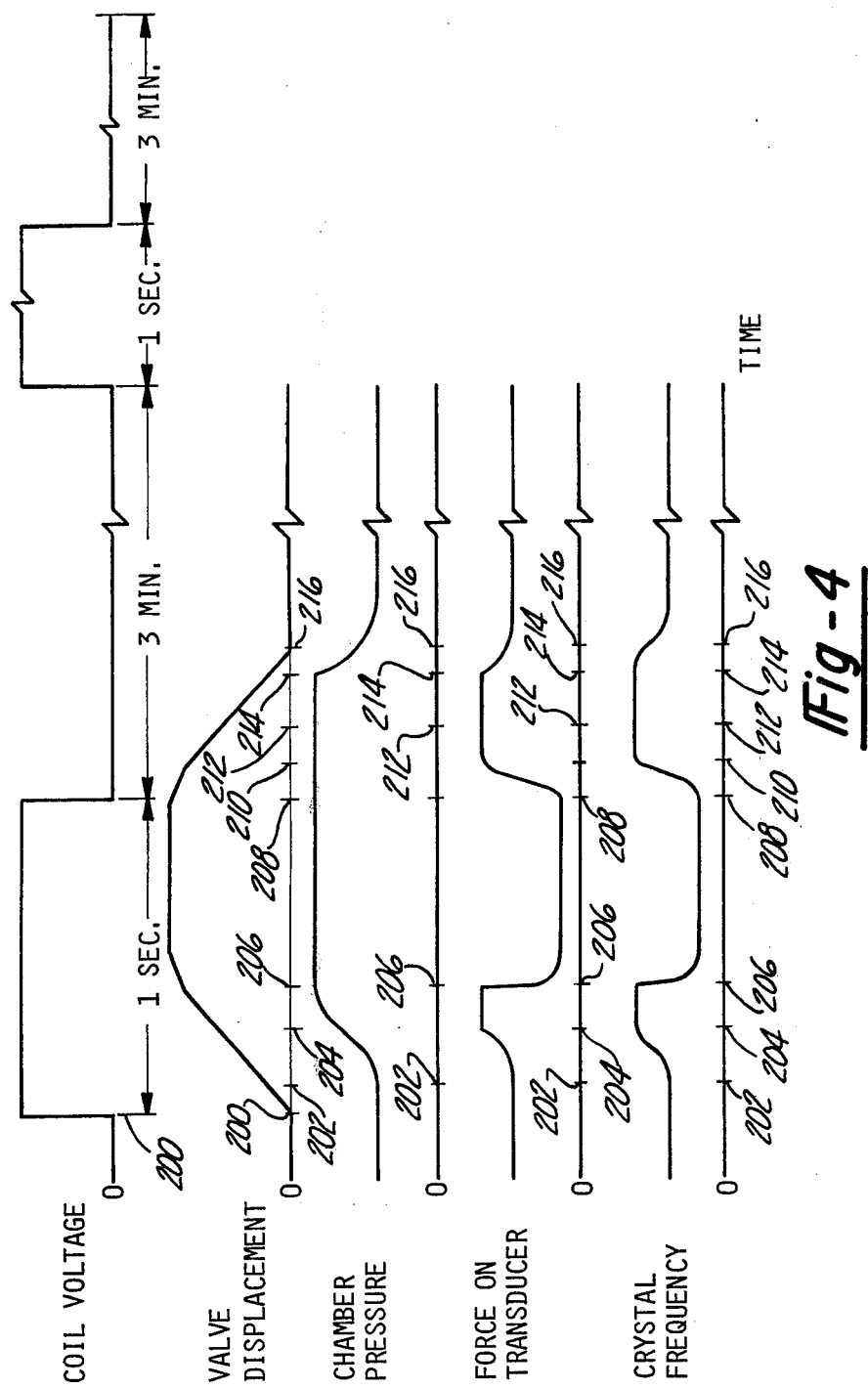

SELF-STANDARDIZING PRESSURE SENSOR FOR USE IN AN ELECTRONIC FUEL CONTROL SYSTEM

TECHNICAL FIELD

The present invention relates to pressure sensors, and more particularly to a self-standardizing manifold absolute pressure (MAP)—ambient atmospheric pressure (AAP) sensor for use in an electronic fuel control system.

BACKGROUND ART

A number of existing electronic fuel control systems use MAP and AAP as control input parameters. The MAP is a primary input in the derivation of manifold air density. The AAP has several uses in a fuel control system, including derivation of the blow back pressure at a cylinder exhaust port; derivation of the manifold vacuum pressure by a subtraction of AAP from MAP for use in control of ignition advance; and derivation of upstream pressure behind an internally constricted exhaust gas recirculation valve.

One known method of obtaining values for both MAP and AAP is to employ a MAP sensor for normal sensing of MAP, and to use the wide open throttle value of MAP as a reasonable approximation of AAP. However, this method has clear limitations, as it is rarely the case in modern highway travel that a vehicle is operated under wide open throttle conditions. Another known method of obtaining values for both MAP and AAP is to employ a respective sensor for each. This method is difficult to justify in terms of cost as the value of AAP need only be updated on an intermittent basis as changes in altitude or similar type environmental influences occur.

In addition, there is a further concern of maintaining calibration of a pressure sensor to assure that zero drift does not significantly affect the accuracy of the sensor output signal. A typical response to this concern has been to use a high-quality, relatively high cost sensor with bounded drift parameters. Such a sensor is calibrated once for its useful life at the time of manufacture. This response has the clear disadvantages of incurring increased cost with only limited assurance of sensor accuracy.

It would be desirable to include in a sensor the capability to perform regular or intermittent standardization to account for zero drift. In the instrumentation art the term "standardization" has the generally accepted meaning of a single-point, automatic re-calibration of those parts of the sensor subject to slow drift due to aging and effects of parameters other than the sensed parameter. In this context, "single point" refers to the zero drift phenomenon, and "automatic" can mean periodic, regularly scheduled, or other controlled sequence of calibration activity.

An objective, therefore, of the present invention is to provide the capability to sense both MAP and AAP in a unitary pressure sensor. A further objective is to include the capability to standardize the pressure sensor in its operation to compensate for drift.

DISCLOSURE OF THE INVENTION

The present invention is a self-standardizing manifold absolute pressure (MAP)—ambient atmospheric pressure (AAP) sensor for use in an electronic fuel control (EFC) system. The sensor embodies in one device the capability to sense both MAP and AAP and to standardize itself in a transition from a MAP reading to an AAP reading. It obviates the need for an auxiliary AAP sensor or an extreme operating condition to obtain an AAP sampling.

In general, the sensor of the present invention is alternately settable under the control of EFC logic between a MAP sensing state and an AAP sensing state. The sensor is normally set to sense MAP, but is switchable on command to sense AAP. In the transition from sensing MAP to sensing AAP, the sensor standardizes itself to compensate for zero drift.

Broadly, the invention contemplates the use of a settable internal valve that is movable between an external MAP port and an external, but isolated AAP port. In normal operation of the sensor, the settable valve is biased to register with the MAP port, but is actuatable in response to command from the EFC logic to move into registry with the AAP port. A preferred form of actuator for the internal valve is a solenoid and Belleville spring assembly. An energization of the solenoid causes mechanical retraction of the spring to occur. The internal valve is connected to the spring and responds to a retraction by moving vertically from a position in registry with the MAP port into a position in registry with the AAP port.

Whichever external port of the sensor is in registry with the settable valve is communicated through an internal passage in the valve to a pressure chamber. One wall of the pressure chamber is defined by a flexural diaphragm. The flexing of the diaphragm in response to pressure variations within the pressure chamber actuates a contact member connected to the external side of the diaphragm. The contact member bears against a force transmitting assembly which applies vertical components of mechanical force to an electro-mechanical transducer, preferably a vibrating piezoelectric crystal. The force transmitting assembly is made up of a pair of counterpoised Belleville springs joined at their centers by a cantilever strut. The application of mechanical force to the electro-mechanical transducer will change its natural or resonant frequency by an amount functionally related to the applied force.

In the transition of the sensing of MAP to the sensing of AAP, the sensor may be standardized to account for zero drift. In the standardization procedure, the force transmitting assembly is effectively unloaded from the effects of MAP and AAP by temporarily removing a normal bias force from the assembly. The bias force is applied by a movable member that is secured to and supported on the diaphragm and normally loads the force transmitting assembly, but which is removed in the transition from sensing MAP to sensing AAP. At this time the sensor may be standardized to account for drift.

When the sensor is being standardized or the AAP is being sensed, the most recently obtained value of MAP can be used by the EFC logic for computational purposes. It is contemplated that the sequence of standardizing and sensing AAP can be accomplished within one second.

The frequency at which the sensor is standardized and AAP is sensed is under the control of the EFC logic. A possible routine for executing this sequence would be once at the time the vehicle is started, and again thereafter at the end of predetermined time intervals; or, alternatively, the AAP can be sensed whenever the MAP makes an excursion beyond a predetermined threshold level.

Other advantages of the present invention will become apparent upon a reading of the following description of a specific embodiment which is to be considered in connection with the drawings.

BRIEF DESCRIPTION OF THE DRAWINGS

FIG. 4 is a timing diagram which illustrates the timing considerations involved in the pressure sensing and standardization steps in each cycle.

BEST MODE FOR CARRYING OUT THE INVENTION

Figure 1:
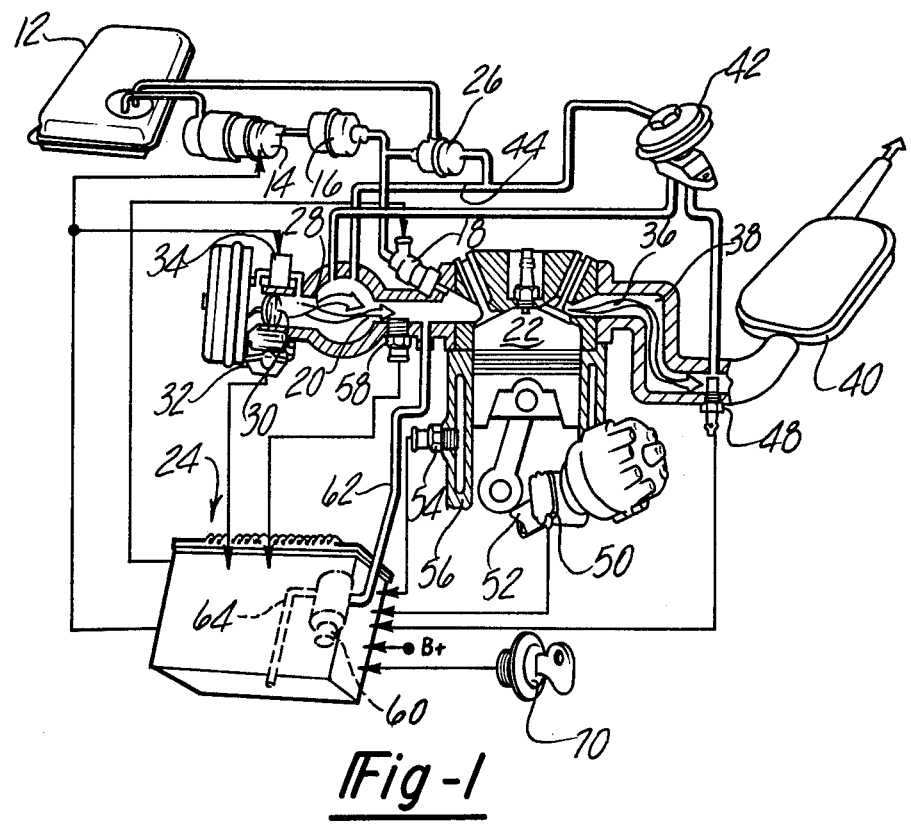
FIG. 1 is an environmental view of an electronic fuel injection system representative of the type for which the MAP-AAP pressure sensor of the present invention is suited.

FIG. 1 is a schematic view of a spark ignition engine equipped with an electronic fuel injection (EFI) fuel control system. It provides a view of a typical environment and control system in which the MAP-AAP pressure sensor of the present invention is useful. FIG. 1 will be described in overview before advancing to a more detailed description of the pressure sensor itself.

The spark ignition engine is supplied with fuel from a tank 12. The fuel is drawn from the tank by a pump 14 and passed through a filter 16, The filtered fuel is supplied to the inlet of an electromagnetic injector valve 18. The injector valve 18 is used to deliver a fuel pulse or charge of controlled timing and duration to the engine intake manifold 20 at a position just upstream of the inlet port of an engine cylinder 22. A constant pressure valve 26 controls the pressure of the fuel at the inlet of the injector valve 18.

The control of the timing and duration of the fuel charge delivered by the injector valve 18 is accomplished by an electronic fuel control unit (ECU), indicated generally at 24. The ECU 24 contains the electronic control logic necessary to determine the appropriate time and duration of the fuel charge on the basis of a plurality of engine operating conditions.

The fuel charge delivered to the intake manifold is mixed with air (indicated by the streamline 28) which passes over a throttle plate 30 and into the intake manifold 20. A throttle switch 32 is used to indicate to the ECU 24 the occurrence of a wide-open throttle condition. A cold start air valve 34 is used to choke the engine at starting.

The by-product of combustion, i.e. exhaust gases 36, are passed from the cylinder 22 into an exhaust manifold 38. The exhaust gases 36 flow through a catalytic converter 40 before emission into the atmosphere.

An exhaust gas recirculation valve 42 is used to recirculate a controlled portion of the exhaust gases 36 back into the intake manifold 20. The reference pressure used by both the constant pressure fuel valve 26 and the exhaust gas recirculation valve 42 is taken by line 44 from the intake manifold 20.

A number of significant engine operating conditions are sensed and used as control input parameters by the ECU 24 for controlling the quantity of fuel to be delivered by the injector valve 18 to the intake manifold 20. More specifically, an oxygen sensor 48 is present in the exhaust manifold 38 to measure the quantity of free oxygen present in the exhaust gases being recirculated. An engine speed sensor 50 is mounted on the distributor shaft 52 to provide a measurement of actual engine speed and of crankshaft position for injection timing reference. A water temperature sensor 54 is mounted on the engine block 56 to measure the temperature of the engine coolant. An air temperature sensor 58 is mounted on the intake manifold 20 to measure air temperature in the manifold 20.

A pressure sensor 60 is housed within the ECU 24 to provide the ECU with information as to both the manifold absolute pressure (MAP) and the ambient atmospheric pressure (AAP). A line or conduit 62 connects one port of the pressure sensor 60 with the intake manifold 20. A second line of conduit 64 communicates another port of the sensor to the atmosphere.

The energization of the ECU 24 is by a battery indicated by B+ and under control of the operator by an ignition switch 70.

Figure 2:
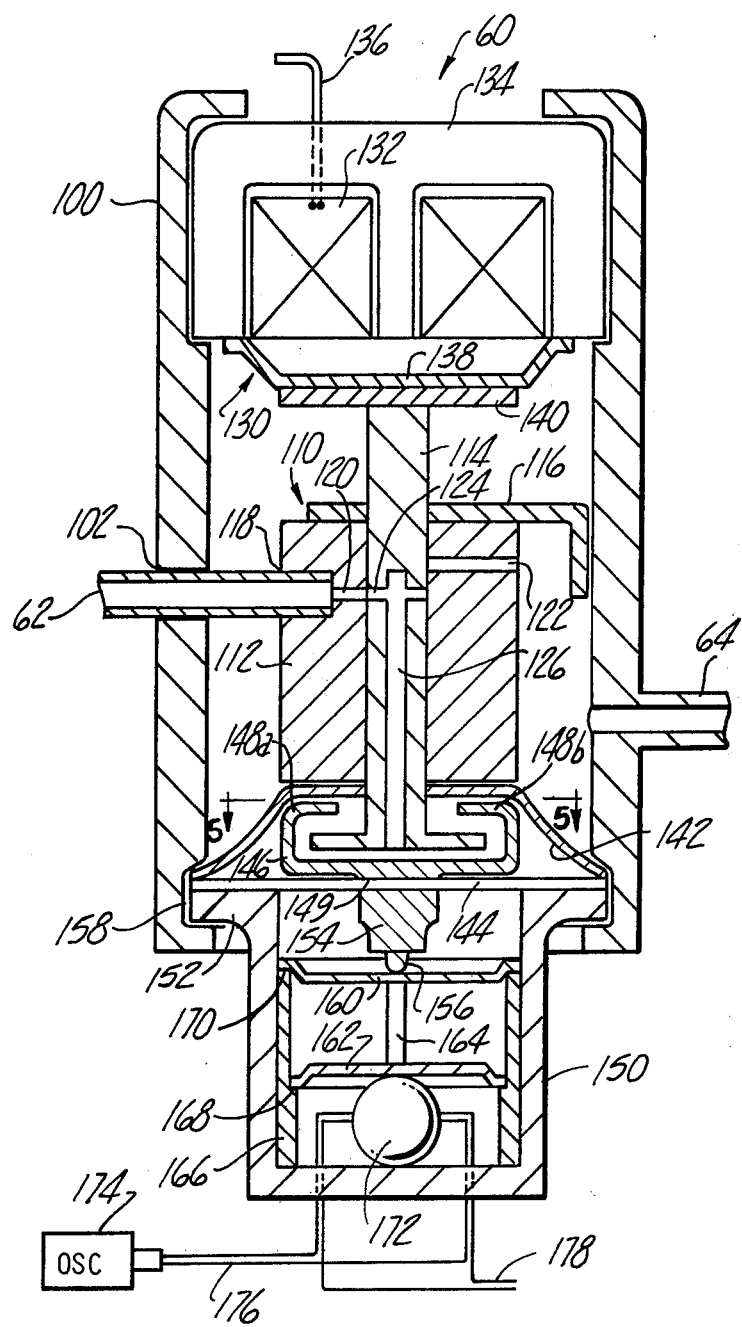
FIG. 2 is an elevational view in cross-section of an embodiment of the MAP-AAP pressure sensor of the present invention.

FIG. 2 is an elevational view taken in cross-section of an embodiment of the MAP-AAP pressure sensor of the present invention. The sensor, indicated generally at 60, has a body 100 defined by a substantially hollow, cylindrical member. The sensor body 100 has formed in one vertical wall an aperture 102 which receives the line or conduit 62 which is connected to the intake manifold. The other line or conduit 64 is formed integrally with the sensor body 100 on the side opposite the line 62. The line 64 is in communication with the atmosphere.

The selection of one or the other of pressure conditions communicated by lines 62 and 64 is controlled by an internal valve, indicated generally at 110. The valve 110 includes a valve body 112 mounted centrally in the sensor body 100 by a mounting bracket 116. The valve body 112 has a central vertical passage within which is disposed a movable valve stem 114. The valve body 112 has formed in one of its sides an opening 118 to receive the line 62 with a fluid-tight coupling. The opening 118 is stepped down midway to a reduced diameter to define a MAP port 120. The other side of the valve body 112 has a vertically offset opening 122 which communicates with the line 64 to define an AAP port. The fluid-tight coupling of the line 62 with the valve body 112 effectively isolates the port 120 from the port 122.

The valve stem 114 has a radial passage 124 which can communicate with either of the ports 120 or 122 depending upon its relative vertical position. An axial passage 126 is formed between the radial passage 124 and the bottom the stem 114 to provide a conduit for air to pass through the stem into an enclosed pressure chamber surrounding the bottom of the stem. At the bottom of the valve stem 114 is an outward radial flange 128.

The relative vertical position of the valve stem 114 is controlled by the energization of a solenoid 132. The solenoid energization is, in turn, controlled by the internal logic of the electronic control unit 24. The ECU 24 is in communication with the solenoid 132 through a pair of leads 136.

The solenoid 132 is disposed within a cup core 134 which forms a major portion of a closed flux path. The minor portion of the flux path is defined by a Belleville spring 130 which is mounted at its peripheral edge to the underside of the solenoid cup core 134. When the Belleville spring 130 is in its relaxed condition or state, its depressed central section 138 is at its most distant point from the solenoid cup core 134. However, upon energization of the solenoid 132, the influence of the magnetic field from the solenoid will cause the central section 138 to be drawn or attracted toward the solenoid with a spring-like deformation.

A plate 140 is connected between the Belleville spring 130 and the valve stem 114 to transmit motion of the Belleville spring to the valve stem. When the Belleville spring 130 is in its normal relaxed condition, it will cause the relative vertical position of the valve stem 114 to bring the MAP port 120 into registry with the radial passage 124. However, upon energization of the solenoid 132 and related upward movement of the Belleville spring section 138, the valve stem 114 will be moved vertically so that the MAP port 120 is closed and the AAP port 122 is brought into registry with the radial passage 124.

The enclosed pressure chamber surrounding the bottom of the valve stem 114 is defined by an annular gasket 142 secured in a fluid-tight seal with a flexural diaphragm 144. The annular gasket 142 has a central aperture which accommodates a fluid-tight, sliding fit with the valve stem 114. The air pressure within the enclosed chamber at any given time will be determined by whichever of the lines 62 or 64 is in communcation with the radial passage 124 of the valve stem 114. A change in air pressure within the chamber will be reflected as a displacing force on the diaphragm 144. In this respect, the diaphragm 144 serves to transduce pressure into force as well as define one wall of the enclosed pressure chamber.

Figure 5:
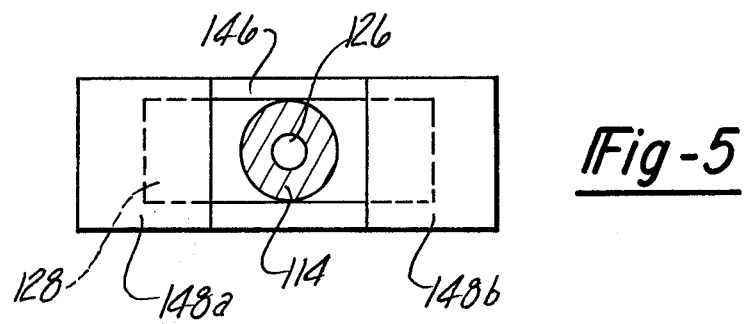
FIG. 5 is a cross-sectional view taken along line 5—5 of FIG. 2 which shows in pertinent part the relationship between certain movable parts in the MAP-AAP pressure sensor.

A lift-off bracket 146 is disposed within the enclosed pressure chamber to apply a normal biasing force to the flexural diaphragm 144. The bracket 146 is supported on and secured to the flexural diaphragm 144 along a raised central section 149. With particular reference to FIG. 5, the lift-off bracket 146 is substantially "C-shaped" and terminates at its opposed ends in a pair of flanges 148a and b. The flanges 148a and b are engageable by the complementary flanges 128 on the lower end of the valve stem 114. The valve stem 114 will undergo a range of lost motion from its lowermost position to proximate its uppermost position before engaging the flanges 148a and b. Upon engagement of the flanges 148a and b by flanges 128 the flexural diaphragm 144 will be displaced upwardly and a standardization of the sensor can be made.

The volume below the flexural diaphragm 144 is maintained as a near-vacuum within a lower chamber housing 150. The chamber housing 150 is mounted proximate the lower end of the sensor body 100 by a radial flange 152 which mates with an internal groove 158 in the sensor body.

An anvil 154 is secured to the underside of the flexural diaphragm 144 and functions as a force transmitting member. The anvil 154 terminates at its lower extremity in a contact point 156 formed of a hardened material.

A pre-loaded spring assembly is used to communicate the force transmitted by the anvil 154 to a vibrating crystal force transducer 172. The spring assembly comprises a pair of counterpoised Belleville springs 160 and 162. A cantilever strut 164 is interposed between the springs in alignment with the contact point 156. The cantilever strut 165 is formed of a rigid material, such as stainless steel. The springs 160 and 162 are mounted by a press or force fit on a member 166 insertable into the vacuum chamber body 150. The mounting member 166 has an intermediate internal ledge 168 for the lower Belleville spring 162 and an upper ledge 170 for the upper Belleville spring 160. The springs are preloaded or stressed by the force fit to provide a continuous minimum force on the vibrating crystal force transducer 172. Moreover, the counterpoised positioning of the springs 160 and 162 will effectively transmit only vertical components of force to the transducer 172.

The vibrating crystal force transducer 172 is in preferred form a piezoelectric crystal. The resonant or natural frequency of the crystal varies as a function of the mechanical load or force bearing vertically against the crystal. A measurement of the mechanical load or force can be made by applying an energization signal at a fixed frequency from an oscillator 174 by means of leads 176 connected to the crystal and measuring the resultant output frequency on output leads 176. A representative frequency of the applied energization signal is 5 MHz. This type of device is in principle similar to the oscillating crystal force transducer system taught in Corbett, U.S. Pat. No. 3,541,849, issued Nov. 24, 1970, whose teaching is hereby incorporated in its entirety.

Figure 3:
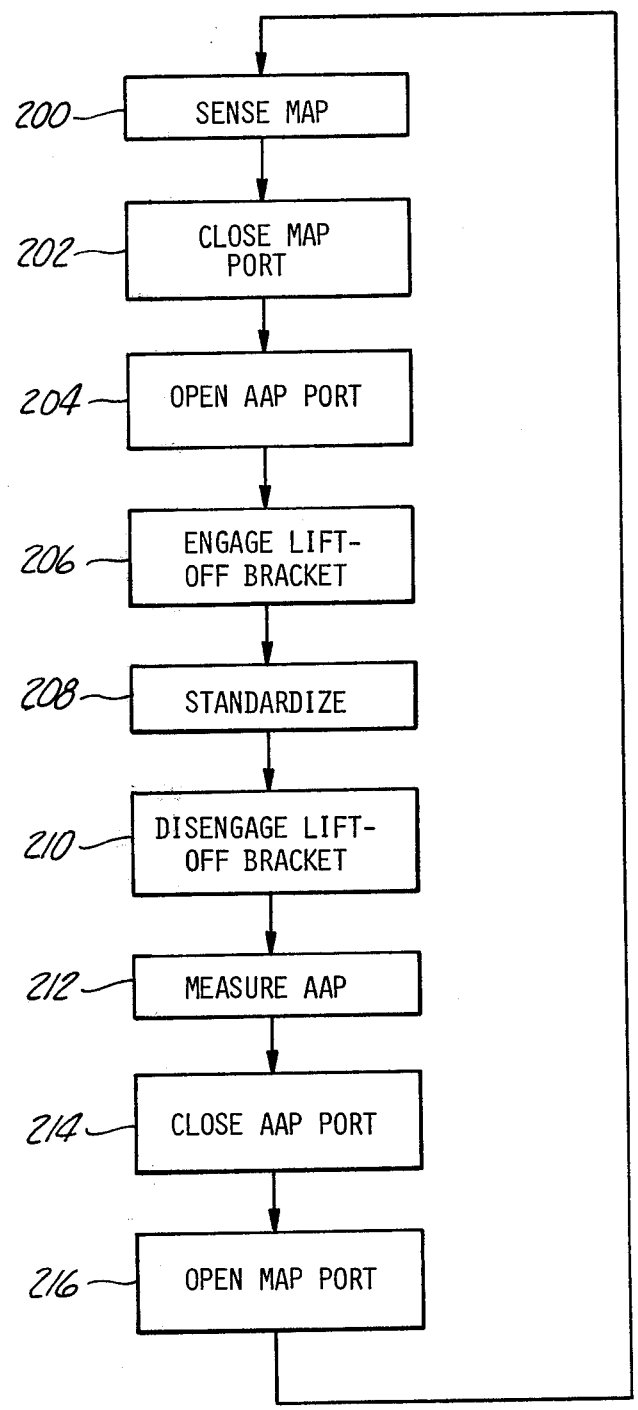
FIG. 3 is a flowchart which sets forth the steps of a MAP-AAP pressure sensing and standardization cycle.

FIG. 3 is a flowchart which illustrates the sequence of steps involved in a full cycle of pressure measurements and sensor standardization.

In step 200, the sequence is begun by the sensing of manifold absolute pressure (MAP). In this step the solenoid 132 is non-energized and the radial passage 124 of the movable valve stem 114 is in registry with the MAP port 120.

In step 202, the MAP port is closed by the action of energizing the solenoid 132 and initiating the upward travel of the valve stem 114.

In step 204, the continued vertical travel of the valve stem 114 causes the radial passage 124 to begin communication with the AAP port 122.

In step 206, the valve stem 114 begins to come into approximation with the upward extent of its vertical travel and engages the lift-off bracket 146. At this time the flexural diaphragm 144 is unloaded from the normal biasing force of the lift-off bracket 146.

In step 208, standardization of the sensor can take place by the effect of unloading the normal bias of the diaphragm 144, and indirectly unloading the transducer 172.

In step 210, the solenoid 132 is de-energized and the valve stem 114 begins downward travel to the point where it disengages the lift-off bracket 146 and returns the normal bias force to the diaphragm 144.

In step 212, the ambient atmospheric pressure is measured as the valve stem 114 descends through a range in which its radial passage 124 is in communication with the AAP port 122.

In step 214, the continued downward travel of the valve stem 114 closes off the AAP port 122.

In step 116, the MAP port 120 is reopened by the effect of the valve stem 114 having completed the full extent of its downward travel.

FIG. 4 is a timing diagram which illustrates the timing considerations involved in one full cycle of pressure measurements and sensor standardization. The reference numerals applied to the timing diagram have direct correspondence with the same use of the reference numerals in the flowchart of FIG. 3.

More specifically, up until the time 200, the solenoid 132 is de-energized; the sensor is measuring MAP; the valve stem displacement is zero; the chamber pressure is equal to MAP; the force on the transducer 172 is proportional to MAP; and the frequency of the transducer is likewise proportional to MAP.

Between times 200 and 202 the valve stem 114 begins its initial upward travel through an amount required to close off the MAP port 120. At time 204, the upward travel of the valve stem opens the AAP port 122. The closing of the MAP port 120 and the opening of the AAP port 122 brings up the pressure in the chamber which produces greater force on the transducer, which, in turn, increases the crystal frequency.

At time 206, the lift-off bracket 146 is engaged as indicated by the slight knee in the valve displacement curve. The effect of engaging the lift-off bracket is to rapidly unload the force to the transducer and lower its natural frequency. From time 206 until time 208 the transducer 172 is unloaded and the sensor may be standardized to account for any zero drift effects that have occurred since the last standardization.

At time 208 the solenoid 132 is de-energized. From time 208 to time 210 the valve stem 114 begins its downward travel to the point where it disengages the lift-off bracket 146. This is reflected by the slight knee above time 210 on the valve displacement curve. Along with the disengagement of the lift-off bracket 146 comes a rapid increase in the force of the transducer 172 and its resonant frequency.

From time 210 until time 212 the AAP port 122 is open and the chamber pressure is equal to the ambient atmospheric pressure. During this time interval a measurement of AAP may be made.

At time 214, the continued downward travel of the valve stem 114 has caused the AAP port 122 to fully close. In addition, the opening of the MAP port is initiated. At time 216, the MAP port becomes fully opened and the normal sensing of MAP may resume.

The coil voltage curve is shown extended into a second MAP-AAP-standardization cycle to indicate schematically that the cycles are scheduled on a periodic basis in the preferred sequence of operation.

The invention has been described in an illustrative manner, and it is to be understood that the terminology which has been used is intended to be in the nature of words of description rather than of limitation.

Many modifications and variations of the present invention are possible in light of the above teachings.

In particular, the invention may readily be adapted to incorporate a small deflection pressure sensor such as a strain gage or capacitor capsule sensor as a transducer element. It may also be adapted to utilize other actuator means, such as a vapor pressure linear motor, and it may be adapted to incorporate an actuator and valve having rotational motion rather than linear motion.

It is, therefore, to be understood that within the scope of the appended claims the invention may be practiced otherwise than as specifically described.

The embodiments of the invention in which an exclusive property or privilege is claimed are defined as follows:

1. A pressure sensor for sensing a first and second pressure for use with an electronic fuel control system having control logic comprising:
   a sensor body defined by a substantially hollow member having an internal chamber and first and second external ports formed therein in communication with the first and second pressure, respectively, the internal chamber having a displaceable wall responsive to the pressure therein;
   valve means, disposed within said internal chamber and movable between registering positions with the first and second external ports, for communicating a selected one of the ports with said internal chamber upon actuation into a registering position therewith;
   actuator means, responsive to a command signal from the control logic selecting one of the external ports, for actuating the valve means into registry with the selected port; and
   transducer means, responsive to displacement of the displaceable wall of said internal chamber, for producing an output signal representative of the displacement of the wall.

2. The pressure sensor as defined in claim 1 further comprising:
   bias means for applying a normal bias displacement to the displaceable wall, but actuatable by movement of the valve means for removing the bias displacement to permit standardization of the pressure sensor.

3. The pressure sensor as defined in claim 2 wherein movement of the valve means from the first port to the second port actuates the bias means, and reciprocal movement of the valve means deactuates the bias means.

4. The pressure sensor as defined in claim 2 wherein the bias means comprises a movable member normally supported by the displaceable wall, but adapted to be engaged by the valve means for movement away from the displaceable wall by actuation of the valve means from the first external port to the second external port, and adapted to be disengaged by the valve means and return to the displaceable wall by actuation of the valve means from the second external port to the first external port.

5. The pressure sensor as defined in claim 4 wherein the valve means includes a plunger-like member mounted for reciprocal travel along an axis substantially normal to the displaceable wall and having a flange formed on its end proximate the wall for engagement with the bias means, and
   the movable member of the bias means includes a complementary flange disposed for engagement with the flange of the valve means after a predetermined range of movement of the valve means out of registry with the first external port.

6. The pressure sensor as defined in claim 2 wherein the bias means is actuated at least once within each cycle of actuation of the valve means.

7. The pressure sensor as defined in claim 1 wherein the displaceable wall of the internal chamber is defined by a flexural diaphragm.

8. The pressure sensor as defined in claim 1 wherein the valve means includes a plunger-like member mounted for reciprocal travel along an axis substantially normal to the displaceable wall, the plunger-like member having an axial passage formed internally with one end opening to the internal chamber and the other end opening to a radial passage, the radial passage being adapted to move into registry with each of the external ports.

9. The pressure sensor as defined in claim 1 wherein the actuator means comprises an inductive coil energizable in response to a command from the EFI control logic, and spring means, connected to the valve means and magnetically coupled to the coil, for normally biasing the valve means in a registering position, with one external port when the coil is deenergized, and moving the valve means into a registering position with the other port when the coil is energized.

10. The pressure sensor as defined in claim 9 wherein the spring means comprises a Belleville spring.

11. The pressure sensor as defined in claim 1 wherein the transducer means includes,
- an electromechanical transducer responsive to an applied force to produce an electrical signal representative of the force, and
- force transmitting means, connected intermediate the displaceable wall and the electromechanical transducer, for transmitting a displacement of the wall as an applied force to the transducer.

12. The pressure sensor as defined in claim 11, wherein the force transmitting means includes means for applying to the transducer only components of force which are normal to the plane of the displaceable wall.

13. The pressure sensor as defined in claim 11, wherein the electromechanical transducer comprises a piezoelectric crystal.

14. The pressure sensor as defined in claim 1, wherein the displaceable wall forms part of the transducer means.

15. A self-standardizing manifold absolute pressure (MAP)—ambient atmospheric pressure (AAP) sensor for use with an electronic fuel control system having control logic comprising:
- a sensor body defined by a substantially hollow member having a first external port adapted to communicate with an engine intake manifold, a second external port adapted to communicate with the atmosphere, and an internal chamber having a displaceable wall responsive to the pressure in the chamber;
- valve means, disposed within the sensor body and movable along an axis between registering positions with the first and second external ports, for communicating a selected one of the ports with the internal chamber upon actuation into a registering position therewith;
- actuator means, responsive to a command signal from the electronic control logic selecting one of the external ports, for actuating the valve means into registry with the selected port;
- bias means for applying a normal bias displacement to the displaceable wall, but actuatable by movement of the valve means for removing the bias displacement at least once through each cycle of actuation of the valve means to permit standardization; and
- transducer means, responsive to displacement of the displaceable wall of the internal chamber, for producing an output signal representative of the displacement of the wall.

16. A pressure sensor for alternately sensing first and second pressure conditions on command from a control logic unit comprising:
- a sensor body defined by a substantially hollow member having an internal chamber and first and second external ports formed therein, the internal chamber having a displaceable wall responsive to the pressure therein;
- valve means, disposed within said internal chamber and movable between registering positions with the first and second external ports in communication with the first and second pressure, respectively, for communicating a selected one of the ports with said internal chamber upon actuation into a registering position therewith;
- actuator means, responsive to a command signal from the control logic unit selecting one of the external ports, for actuating the valve means into registry with the selected port; and
- transducer means, responsive to the displacement of the displaceable wall of said internal chamber, for producing an output signal representative of the displacement of the wall.

17. The pressure sensor as defined in claim 16 wherein the displaceable wall forms part of the transducer means.

* * * * *